(12) United States Patent
Orr

(10) Patent No.: US 12,307,060 B2
(45) Date of Patent: May 20, 2025

(54) PRESSURE SENSING IN A CAPACITANCE MODULE

(71) Applicant: Cirque Corporation, Sandy, UT (US)

(72) Inventor: David Orr, Salt Lake City, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 18/226,454

(22) Filed: Jul. 26, 2023

(65) Prior Publication Data

US 2025/0036241 A1   Jan. 30, 2025

(51) Int. Cl.
*G06F 3/044* (2006.01)
*G06F 3/01* (2006.01)

(52) U.S. Cl.
CPC ............ *G06F 3/0446* (2019.05); *G06F 3/016* (2013.01); *G06F 2203/04105* (2013.01); *G06F 2203/04107* (2013.01)

(58) Field of Classification Search
CPC ........ G06F 18/217; G06F 18/21; G06F 18/25; G06F 18/00; G06F 3/0446; G06F 3/0445; G06F 3/0412; G06F 3/04166; G06F 3/04186; G06F 3/044; G06F 3/0447; G06F 3/045; G06F 3/04144; G06F 2203/04106; G06F 2203/04104; G06F 2218/00
See application file for complete search history.

(56) References Cited

U.S. PATENT DOCUMENTS

| | | | |
|---|---|---|---|
| 6,504,530 B1 * | 1/2003 | Wilson | G06F 3/04186 345/173 |
| 10,296,091 B2 | 5/2019 | Heubel | |
| 2008/0309632 A1 * | 12/2008 | Westerman | G06F 3/0485 345/173 |
| 2014/0368454 A1 | 12/2014 | Morita | |
| 2018/0059866 A1 * | 3/2018 | Drake | G06F 3/0446 |
| 2018/0341363 A1 * | 11/2018 | Wang | G06F 3/0418 |
| 2019/0073076 A1 * | 3/2019 | Kuo | G06F 3/0418 |
| 2019/0258341 A1 * | 8/2019 | Sleeman | G06F 3/0445 |
| 2020/0272273 A1 * | 8/2020 | Aubry | G06F 3/016 |
| 2021/0019009 A1 * | 1/2021 | Jung | G06F 3/044 |
| 2021/0278967 A1 * | 9/2021 | Rosenberg | G06F 3/0418 |

* cited by examiner

*Primary Examiner* — Dong Hui Liang

(57) ABSTRACT

A capacitance module may include a substrate; a plurality of capacitance electrodes on the substrate; a pressure sensor incorporated into the capacitance module and in communication with a controller; the plurality of capacitance electrodes being in communication with the controller; memory in communication with the controller having programmed instructions that, when executed, cause the controller to determine an initial pressure measurement of a press input based on a pressure input from the pressure sensor; and determine a maintenance pressure force during the press input based on a capacitance measurement.

16 Claims, 18 Drawing Sheets

PRESSURE SENSING IN A CAPACITANCE MODULE

FIELD OF THE DISCLOSURE

This disclosure relates generally to systems and methods for measuring a press input. In particular, this disclosure relates to systems and methods for measuring a press input on a capacitance module using a pressure sensor and a capacitance measurement.

BACKGROUND

A capacitance module is often used within an electronic device to measure properties of a press input.

An example of a pressure sensor is disclosed in U.S. Pat. No. 10,296,091 issued to Robert W. Heubel, et al. This reference discloses a method of generating haptic effects includes detecting an input of pressure applied to a device using a gesture and determining a level associated with the gesture based on the pressure input, as well as determining a selection of an item at the level based on the gesture and a context associated with the item at the level, along with generating a contextual haptic effect comprising haptic parameter based on the context of the item at the level.

Another example of a pressure sensor is disclosed in U.S. Patent Publication No. 2014/0368454 issued to Regis Croisonnier, et al. This reference discloses a control method for a function of a touchpad utilizing a capture device includes measuring an analog threshold pressure value, and differentials thereof, and delivering event signals based upon the threshold pressure values and differentials thereof to execute a selected function. The capture device for remote, virtual on-screen data input by hand annotation includes at least three functional layers including a bottom rigid layer, a middle pressure sensor layer, a capacitive flexible sensor layer, and a top flexible panel layer. The bottom rigid layer has a surface that provides a mechanical support for writing. The middle pressure sensor layer is adapted to measuring a pressure array or map on the capture active area and to send data representing the measured pressure to a personal computer. The top flexible touch-sensitive passive LCD display layer includes an LCD surface by which whatever is written down on the LCD is impressed graphically due to its liquid crystal physical properties wherein applied pressure changes the crystal particles orientation and light properties, such that when a stylus presses against a writing surface thereof, it leaves a visible trace allowing the user to produce a drawing though no real ink has flown.

Each of these references are herein incorporated by reference for all that they disclose.

SUMMARY

A capacitance module may include a substrate; a plurality of capacitance electrodes on the substrate; a pressure sensor incorporated into the capacitance module and in communication with a controller; the plurality of capacitance electrodes being in communication with the controller; memory in communication with the controller having programmed instructions that, when executed, cause the controller to determine an initial pressure measurement of a press input based on a pressure input from the pressure sensor; and determine a maintenance pressure force during the press input based on a capacitance measurement.

Determining the initial pressure measurement may include determining a press input start time.

The programmed instructions may be further configured, when executed, to cause the controller to execute an initial haptic action in response to determining the initial pressure measurement.

The initial haptic action may be a down-click haptic response.

Determining the maintenance pressure force may be based, at least in part, on the capacitance measurement value staying above a predetermined capacitance measurement threshold.

The programmed instructions may be further configured, when executed, to cause the controller to determine an increase in the maintenance pressure force based, at least in part, on a second pressure measurement from the pressure sensor.

The programmed instructions may be further configured, when executed, to cause the controller to execute a secondary haptic action in response to determining the increase maintenance pressure measurement.

The secondary haptic action may be a second down-click haptic response.

The programmed instructions may be further configured, when executed, to cause the controller to determine a termination of the press input based, at least in part, on the capacitance measurement.

The programmed instructions may be further configured, when executed, to cause the controller to execute a termination haptic action in response to determining the termination of the press input.

The termination haptic action may be an up-click haptic response.

A computer-program product for using a capacitance module, the computer-program product may include a non-transitory computer-readable medium storing instructions executable by a processor to determine an initial pressure measurement of a press input on a capacitance module based on a pressure input from the pressure sensor incorporated into the capacitance module; and determine a maintenance pressure during the press input based on a capacitance measurement from at least one capacitance sensing electrode incorporated into the capacitance module.

Determining the initial pressure measurement may include determining a press input start time.

The programmed instructions may be further configured, when executed, to cause the controller to execute an initial haptic action in response to determining the initial pressure measurement.

Determining the maintenance pressure force may be based, at least in part, on the capacitance measurement value staying above a predetermined capacitance measurement threshold.

The programmed instructions may be further configured, when executed, to cause the controller to determine an increase in the maintenance pressure force based, at least in part, on a second pressure measurement from the pressure sensor.

The programmed instructions may be further configured, when executed, to cause the controller to execute a secondary haptic action in response to determining the increase maintenance pressure measurement.

The programmed instructions may be further configured, when executed, to cause the controller to determine a termination of the press input based, at least in part, on the capacitance measurement.

The programmed instructions may be further configured, when executed, to cause the controller to execute a termination haptic action in response to determining the termination of the press input.

A method for using a capacitance module may include determining an initial pressure measurement of a press input on a capacitance module based on a pressure input from the pressure sensor incorporated into the capacitance module; and determining a maintenance pressure during the press input based on a capacitance measurement from at least one capacitance sensing electrode incorporated into the capacitance module.

A capacitance module may include a substrate; a plurality of capacitance electrodes on the substrate; a pressure sensor incorporated into the capacitance module and in communication with a controller; the plurality of capacitance electrodes being in communication with the controller; memory in communication with the controller having programmed instructions that, when executed, cause the controller to perform a first haptic action based on a pressure input from the pressure sensor; and perform a second haptic action based on a capacitance input from the plurality of capacitance electrodes.

The pressure sensor may include a piezoelectric device.

The pressure sensor may include an inductive coil.

The pressure sensor may include a strain gauge.

The first haptic action may be a down-click haptic response.

The second haptic action may be an up-click haptic response.

The capacitance input may include a change in finger area in contact with a capacitance reference surface.

The capacitance input may include a change in distance between a user finger and the plurality of capacitance electrodes.

A capacitance module may include a substrate; a plurality of capacitance electrodes on the substrate; a pressure sensor incorporated into the capacitance module and in communication with a controller; the plurality of capacitance electrodes being in communication with the controller; memory in communication with the controller having programmed instructions that, when executed, cause the controller to determine a first pressure measurement at $T_0$ based on a pressure input from the pressure sensor; and determine a second pressure measurement at $T_1$ based on a capacitance input from the plurality of capacitance electrodes.

A capacitance module may include a substrate; a plurality of capacitance electrodes on the substrate; a pressure sensor incorporated into the capacitance module and in communication with a controller; the plurality of capacitance electrodes being in communication with the controller; memory in communication with the controller having programmed instructions that, when executed, cause the controller to determine a start time of a press input based on a pressure input from the pressure sensor; and determine an end time of the press input based on a capacitance measurement from the plurality of capacitance electrodes.

The programmed instructions may be further configured, when executed, to cause the controller to determine a secondary press event based on a second pressure input from the pressure sensor.

The secondary pressure event may be an increase in pressure during the press input.

The programmed instructions may be further configured, when executed, to cause the controller to determine a secondary press event based on change in capacitance measurement.

Figure 1:
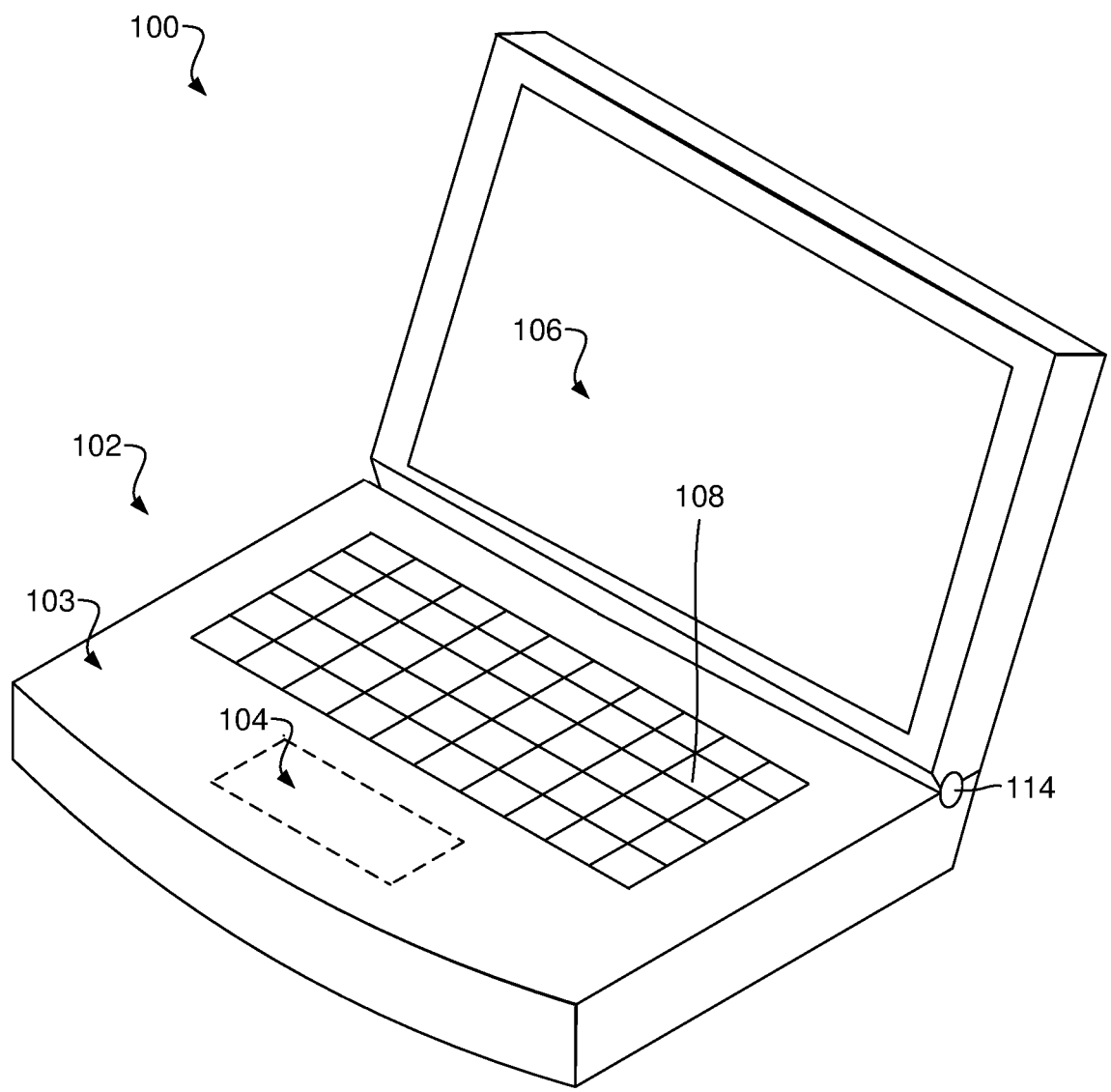
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "press input" may generally refer to a force applied to a surface by an object pressing on the surface at a certain measurable location with a certain measurable force. In some cases, the object may be a finger, a stylus, a palm of a hand or any other object capable of pressing against a surface. In some examples, the location of the press input may be a point, a series of points or an area corresponding to the area of the object. For example, a finger may press on a surface of a capacitance module at a certain location and a certain magnitude that may be measured by a pressure sensor. In some examples, multiple magnitudes at multiple locations may be measured as a single press input. In other examples, a pressure input may be one magnitude at one location.

For the purposes of this disclosure, the term "haptic action" may generally refer to a force, vibration, motion, or combinations thereof within an electrical device that may be intended to communicate through the sense of touch. In some examples, a haptic action may be produced by an oscillating motion of an object. In some examples, an oscillating object may cause other objects around the object to oscillate or vibrate. In this example, the surface that the user may touch or feel may be caused to vibrate and this is an example of a haptic action. In some examples, the haptic action may be caused with a piezoelectric device, a rotating device, a linear actuator, a resonant actuator, an inductive device, a capacitive device, another appropriate device for causing a haptic action, or combinations thereof.

For the purposes of this disclosure, the term "pressure sensor" may generally refer to an electronic component or device that measures the force, location, duration, another property and/or a combination thereof, of a press input. In some examples, a pressure sensor may be a piezoelectric device, an inductive device, a linear actuator, a resonant actuator, a strain gauge, another appropriate device for measuring pressure, or combinations thereof. In some examples, pressure sensors may also be a haptic device used for producing a haptic action. In some examples, a controller in communication with a pressure sensor may determine that a pressure threshold has been reached based, at least in part, on measurements received from the pressure sensor.

For the purposes of this disclosure, the term "initial pressure measurement" may generally refer to a measurement of the initial change in force of a press input. In some examples, the initial pressure measurement may be the change in voltage based, at least in part, on a pressure sensor being compressed by a press input. In some examples, an initial pressure measurement may be a relative pressure measurement.

For the purposes of this disclosure, the term "maintenance pressure measurement" may generally refer to a measurement of the continued pressure applied by a press input. In some examples, a maintenance pressure measurement may be a capacitance measurement. In some examples, the maintenance pressure measurement may be an absolute measurement related to the amount of pressure being applied by a press input.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approaches the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
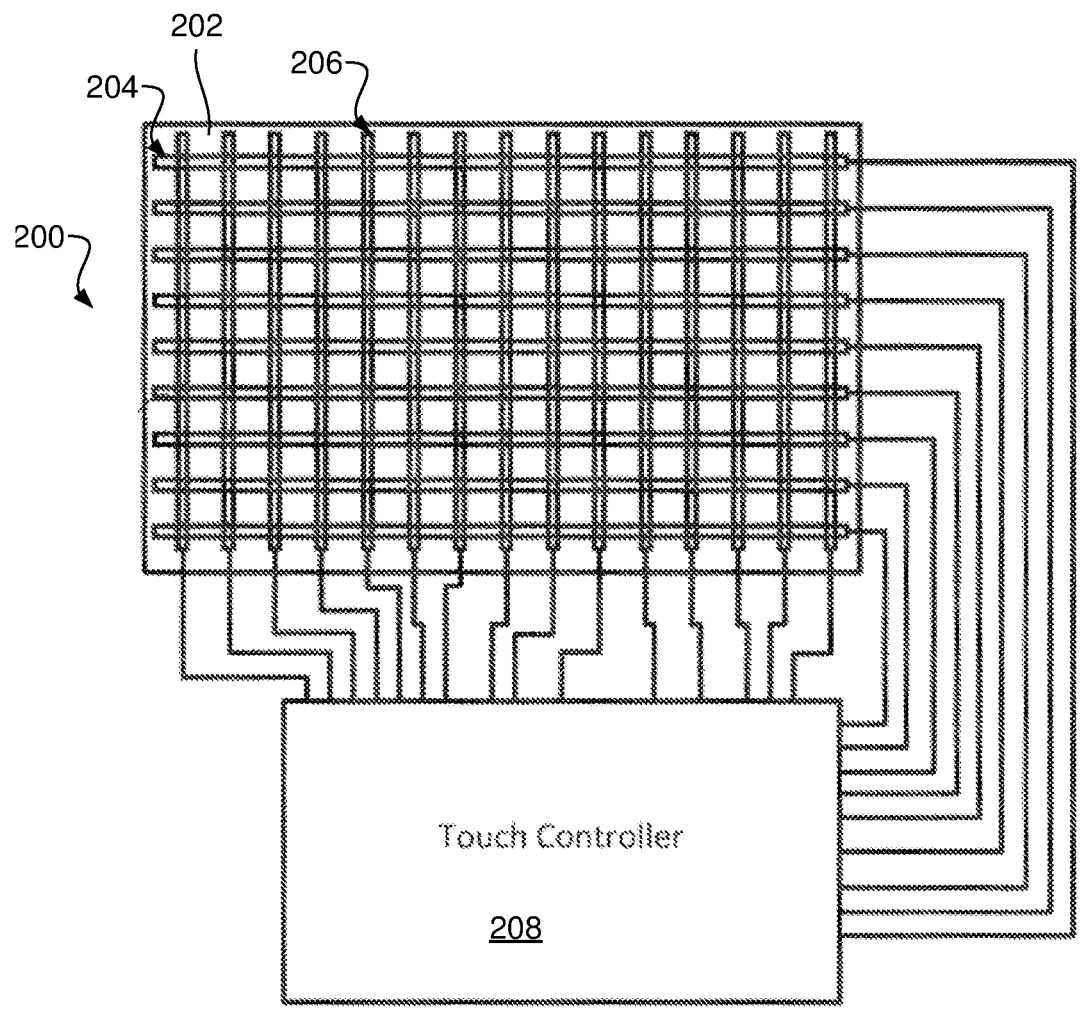
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
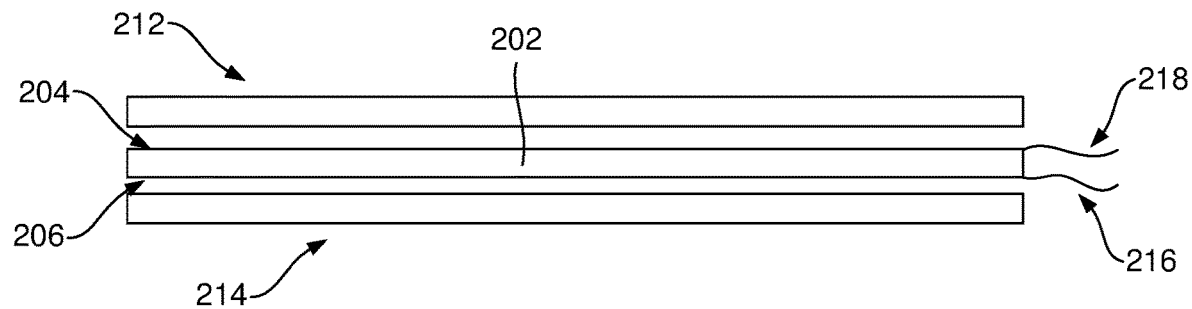
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approaches the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is a solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is in communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
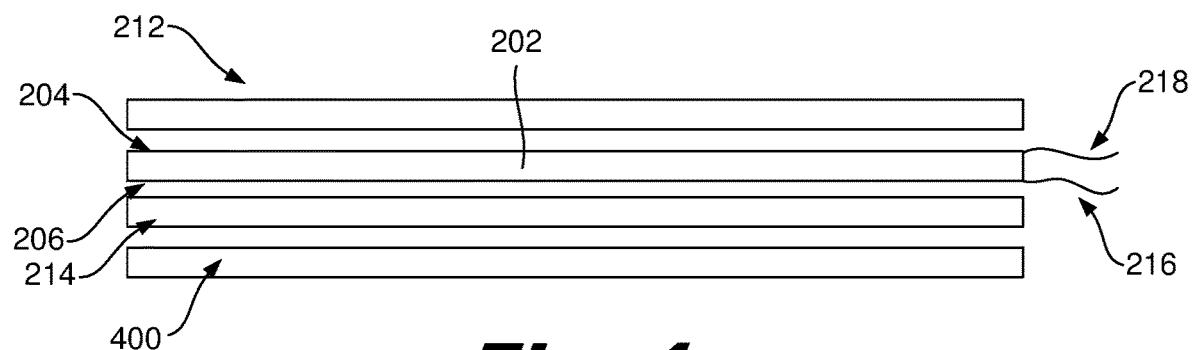
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
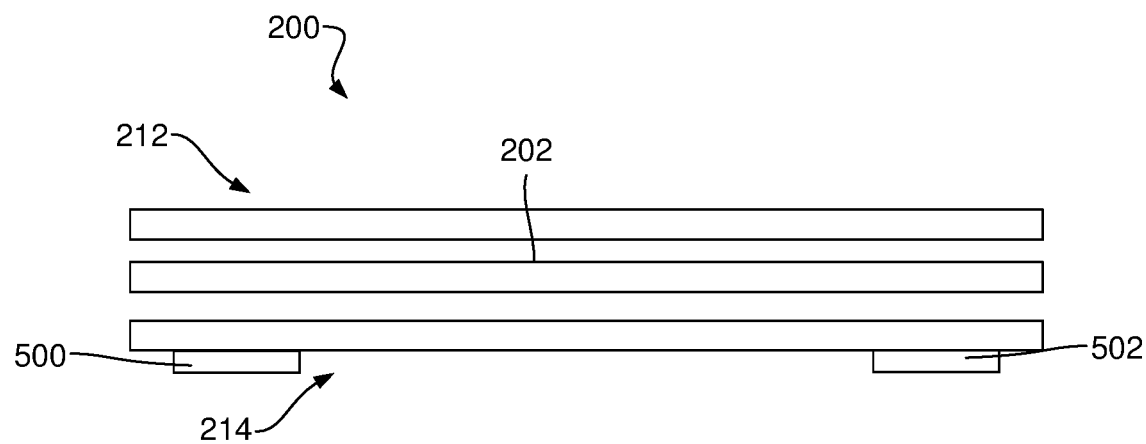
FIG. 5 depicts an example of an input surface in accordance with the disclosure.

FIG. 5 depicts an example of a cross section of a capacitance module 200 where the substrate 202 may be located between a capacitance reference surface 212 and a shield 214. In this example, a first pressure sensor 500 and a second pressure sensor 502 are incorporated into the capacitance module pad 200. As depicted in this example, the pressure sensors 500, 502 may be disposed adjacent to an underside of the shield 214. But, in other examples, the pressure sensors may be positioned at any appropriate location, including, but not limited to, adjacent the underside of the capacitance reference surface 212, adjacent the underside of the shield, adjacent the underside of the substrate 202, another location, or combinations thereof. In examples where the pressure sensors 500, 502 are positioned under the substrate 202, pressure applied to the capacitance reference surface 212 may be transmitted through the capacitance reference surface 212 exerting a pressure on the substrate 202, which in turn applies a pressure to at least one of the pressure sensors 500, 502. In examples where the pressure sensors are positioned adjacent to the shield, the pressure applied to input surface may be transmitted to the shield, which in turn applies the pressure to the pressure sensors. This pressure may be measured by the pressure sensors 500, 502 to determine the value of the pressure.

In this example, the first pressure sensor 500 is spaced apart from the second pressure sensor 502 at a distance along a length, width, and/or another dimension of the capacitance reference surface 212, which may allow the first pressure sensor 500 and the second pressure 502 to detect different levels of pressure depending on the location where the pressure input is made on the capacitance reference surface 212. In some cases, those pressure sensors that are closer to the location where the pressure input is made can detect a greater pressure force than the pressure sensor that is located farther away. The differing pressure values may help determine where the pressure input is made.

While this example is depicted with a pressure sensor incorporated into a capacitance module with a capacitance sensor, in other examples, the pressure sensors are not incorporated with a capacitance sensor. Further, any appropriate type of pressure sensor may be used in accordance with the principles described herein. For example, a non-exhaustive list of suitable pressure sensors includes, but is not limited to, piezoelectric sensors, magnostrictive sensors, potentiometric pressure sensors, inductive pressure sensors, capacitive pressure sensors, strain gauge pressure sensors, variable reluctance pressure sensors, other types of pressure sensors, or combinations thereof.

In some examples, the pressure sensor may also include an ability to provide haptic feedback. For example, a piezoelectric device may be used as both a pressure sensor and as a haptic device. When the piezoelectric material is compressed due to the application of pressure through the capacitance reference surface, the piezoelectric material may produce an electric signal with can be detected by a controller. In some cases, the controller may produce an electric signal that is sent to the piezoelectric material to cause the piezoelectric material to expand, contract, and/or vibrate. The vibrations from the piezoelectric material may cause the capacitance reference surface to vibrate. This vibration may communicate a haptic signal to the user. However, in some examples, the pressure sensors are not configured to provide a haptic signal.

Figure 6:
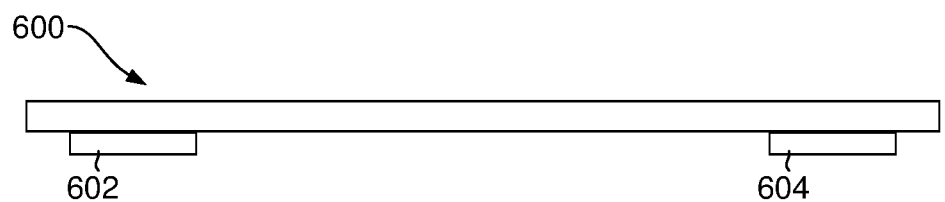
FIG. 6 depicts an example of an input surface in accordance with the disclosure.

FIG. 6 depicts an example of a reference surface 600. In this example, a first pressure sensor 602 and a second pressure sensor 604 are located adjacent to the reference surface 600. In this example, the first pressure sensor 602 and the second pressure sensor 604 are not incorporated into a stack having a capacitance sensor.

Figure 7:
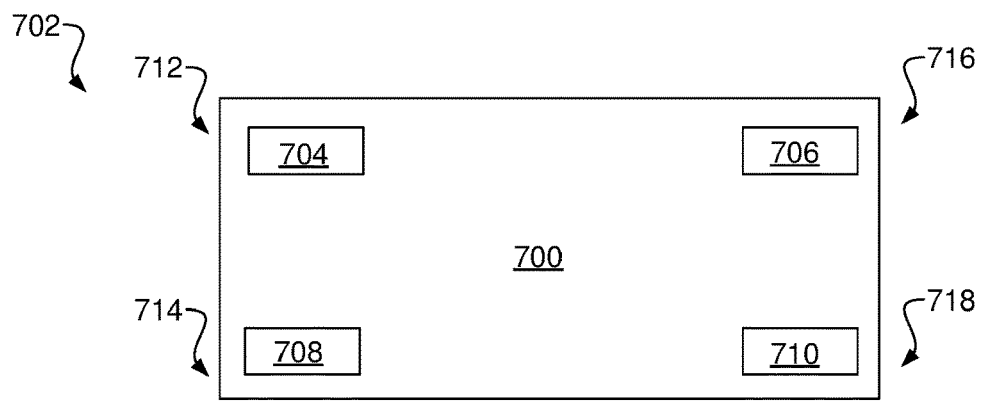
FIG. 7 depicts an example of an arrangement of pressure sensors in accordance with the disclosure.
Figure 8:
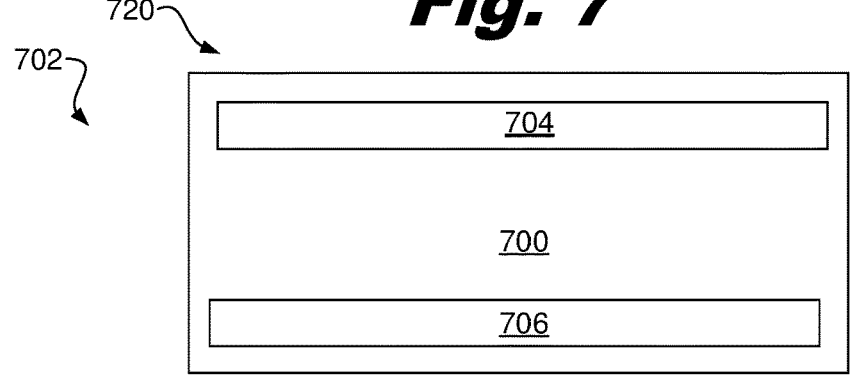
FIG. 8 depicts an example of an arrangement of pressure sensors in accordance with the disclosure.
Figure 9:
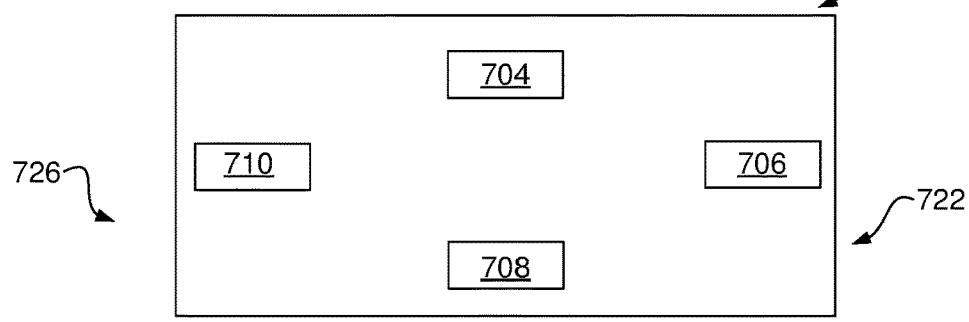
FIG. 9 depicts an example of an arrangement of pressure sensors in accordance with the disclosure.
Figure 10:
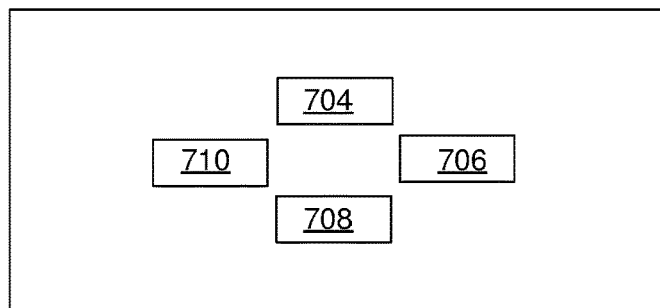
FIG. 10 depicts an example of an arrangement of pressure sensors in accordance with the disclosure.

FIGS. 7-10 depict examples of pressure sensors depicted on an underside 700 of a reference surface 702. In the example of FIG. 7, the reference surface 702 has a rectangular shape and pressure sensors 704, 706, 708, 710 are positioned in each of the corners 712, 714, 716, 718. In the example of FIG. 8, just a first pressure sensor 704 is depicted on a first side 720, and a second pressure sensor 706 is depicted on a second side 722 of the input surface 702. In the example of FIG. 9, the pressure sensors 704, 706, 708, 710 are depicted in the center of the first side 720, the second side 722, the third side 724, and the fourth side 726. In the examples of FIG. 10, the pressure sensors 704, 706, 708, 710 are depicted towards the center of the input surface and away from the edges and corners of the input surface 702.

While the examples in FIGS. 7-10 are described with reference to a specific number of pressure sensors, any appropriate number of pressure sensors may be disposed adjacent to the input surface. For example, the number of pressure sensors may include one pressure sensor or multiple pressure sensors. While the examples depicted above are described with reference to specific patterns and locations for the pressure sensors, other arrangements are contemplated including, but not limited to, symmetric distribution of sensors, an asymmetric distribution of sensors, other distributions and patterns of sensors, or combinations thereof.

Figure 11:
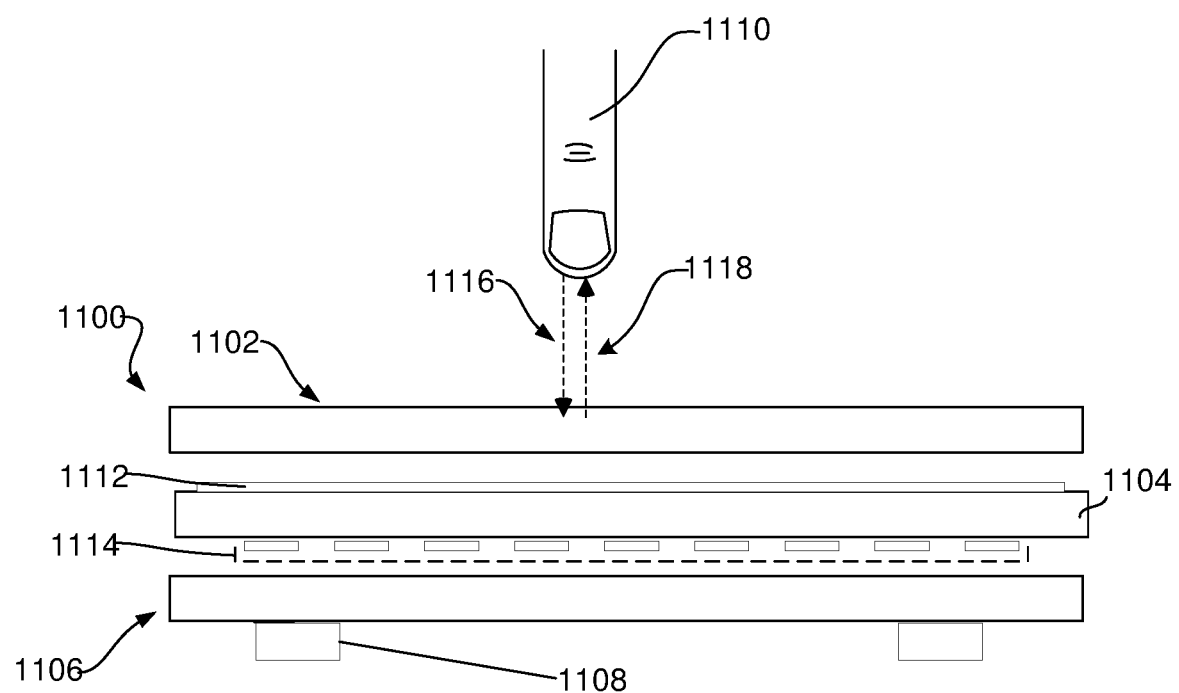
FIG. 11 depicts an example of a press input in accordance with the disclosure.

FIG. 11 depicts an example of a cross section of a capacitance module 1100. A first substrate 1104 may be located between a reference surface 1102 and a second substrate 1106. The first substrate 1104 has a first side with a first set 1112 of electrodes and a second side with a second set 1114 of electrodes. The second substrate 1106 has a first side and a second side. A pressure sensor 1108 is positioned adjacent to the second side of the substrate 1106. An object 1110 moves along a first path 1116 and then along a second path 1118. In this example, the object 1110 is a finger. In some examples, the finger 1110 may move along the first path 1116, apply a press input to the capacitance reference surface 1102, then release the press input as it moves along the second path 1118. In some examples, the finger 1110 may maintain the press input for a measurable time between the two movements.

In some examples, the press input of the finger 1110 may be measured by the capacitance module 1100. In some examples, the pressure sensor 1108 may determine the magnitude, location, another property, and/or a combination thereof of the press input. In some examples, the pressure sensor 1108 may be a piezoelectric pressure sensor. In some examples, the pressure sensor 1108 may measure the change in the magnitude of the force input as the finger 1110 applies the press input. In some examples, a controller in communication with the pressure sensor 1108 may determine that the magnitude of the press input is larger than a predetermined threshold. In some examples, a controller in communication with the pressure sensor 1108 may determine that a press input may be a down-click by the finger 1110.

In some cases, the pressure sensor may be a relative pressure sensor that detects a change in pressure rather than an absolute pressure. In some cases, the pressure sensor's measurement may normalize after the initial pressure measurement is made resulting in an initial spike in the pressure sensor's measurement. In some cases, the pressure measurement may initially cross the predetermined threshold to a peak and shortly thereafter normalize back under the predetermined threshold towards the baseline pressure measurement.

In some examples, the sets 1112, 1114 of capacitance electrodes may be a part of a capacitance pressure sensing circuit. In some examples, the sets 1112, 1114 of capacitance electrodes may be a part of another capacitance sensing circuit for detecting an object moving proximate the capacitance module 1100. In some examples, the capacitance pressure sensing circuit may determine the magnitude, location, another property, and/or a combination thereof of the press input. In some examples, the capacitance pressure sensing circuit may determine the magnitude of a press input based, at least in part, on a voltage measured by the sets 1112, 1114 of capacitance electrodes related to the magnitude of the press input. In some examples, when the magnitude of the press input increases, the voltage measured by the capacitance pressure sensing circuit increases. In some examples, a controller in communication with the capacitance pressure sensing circuit may determine that the voltage measured by the capacitance pressure sensing circuit may be above or a below a predetermined threshold. In some examples, the voltage changing from above the threshold to below the threshold may trigger the controller to determine that the press input has been terminated. In some examples, the voltage changing from below the threshold to above the threshold may trigger the controller to determine that a press input has been initiated.

In some examples, the capacitance pressure sensing circuit and the pressure sensor 1108 may both be used to determine the properties of a press input. In some examples, a controller in communication with the pressure sensor and/or the capacitance pressure sensing circuit may use measurements from one or both to determine that a press input has been initiated and/or terminated. In some examples, a measurement from the pressure sensor may determine that a press input has been initiated and the measurement from the capacitance pressure sensing circuit may determine that a press input has been terminated.

For example, when the finger 1110 presses down on the capacitance module 1100, the pressure sensor 1108 may detect a change in the magnitude of the press input. A controller in communication with the pressure sensor may determine that a press input has been initiated based, at least in part, on the change in voltage measured by the pressure sensor. The capacitance pressure sensing circuit may measure a voltage level based, at least in part, on the force applied to the capacitance module by the finger. A controller in communication with the capacitance pressure sensing circuit may determine a maintenance threshold voltage based, at least in part, on the voltages measured on the pressure sensor and/or the capacitance pressure sensing circuit. When the finger 1110 releases the press input, the voltage measured on the capacitance pressure sense circuit may go below the maintenance voltage threshold. A controller in communication with the capacitance pressure sensing circuit may determine that the press input has been released.

In some examples, when the finger 1110 applies a press input to the capacitance module 1100, it may apply the press input in a manner in which the rate of change measured by the pressure sensor 1108 may fail to trigger the detection of a press input. In such an example, the capacitance pressure sensing circuit may measure a voltage that triggers a controller in communication with the capacitance pressure sensing circuit to determine that a press input has occurred. In some examples, a controller in communication with the capacitance pressure sensing circuit can determine that a press input has occurred without a measurement from the pressure sensor.

In some examples, the finger 1110 may apply a second press input after applying the first press input. In such an example, a controller in communication with the pressure sensor may determine that a second press input has occurred. In some examples, a second threshold voltage for the capacitance pressure sensing circuit may be determined for a second press input. In some examples, when the finger 1110 applies more pressure after the initial press input, a controller in communication with the capacitance pressure sensing circuit may determine that a second press input has occurred based, at least in part, on the change in voltage on the capacitance pressure sensing circuit.

In some examples, a controller in communication with the pressure sensor 1108 and the capacitance pressure sensing circuit may determine a maintenance threshold for the capacitance pressure sensing circuit based on the measurements form the pressure sensor. In some examples, the magnitude of a press input may be determined by measuring the voltage on the capacitance pressure sensing circuit when the rate of change of the press input measured by the pressure sensor has gone to zero. In some examples, a maintenance threshold may be determined, at least in part, by the magnitude of the press input determined in this way.

In some examples, the pressure sensor 1108 may produce a haptic response in the capacitance module 1100 when an electrical current is applied to the pressure sensor. In some examples, after a press input initiation has been detected, a controller in communication with the pressure sensor 1108 may trigger a haptic response in the pressure sensor 1108. In some examples, a second haptic response may be triggered by a second detected press input initiation. In some examples, another device or devices may produce the haptic response.

While in the depicted example the pressure sensor 1108 is positioned adjacent to the substrate 1106, in other examples, the pressure sensor may be located adjacent to the capacitance reference surface, adjacent to the first substrate 1104, or in any other appropriate location. In some examples, the capacitance module 1100 may have a plurality of pressure sensors. In some examples, the plurality of pressure sensors may be used to determine the location, magnitude, speed, another property and/or a combination thereof of a press input.

In some examples, the pressure sensor may be an inductance pressure sensor, an acoustic pressure sensor, a strain gauge pressure sensor, or any other type of pressure sensor. In some examples, the pressure sensor 1108 may measure a negative voltage when the finger 1110 releases the press input on the capacitance module. In some examples, a controller in communication with the pressure sensor 1108 may determine that a press input has been terminated based, at least in part, on the measured negative voltage of the pressure sensor reaching a negative voltage threshold.

Figure 12A:
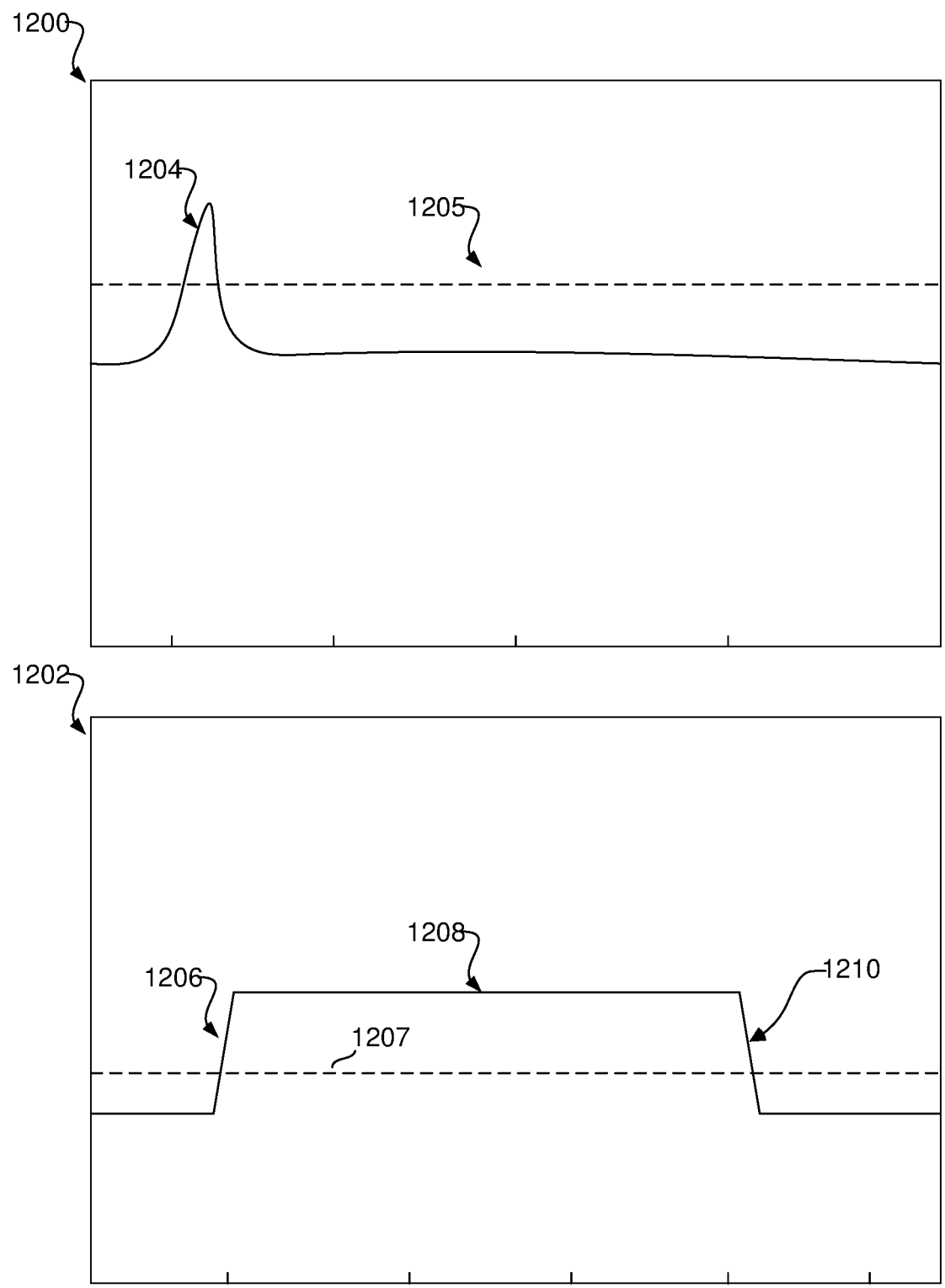
FIG. 12A depicts an example of press input measurements in accordance with the disclosure.

FIG. 12A depicts an example of a pressure sensor graph 1200 and a capacitance pressure sensing circuit graph 1202. In this example, the two graphs represent the measurements on the pressure sensor 1108 and the capacitance pressure sensing circuit of the example depicted in FIG. 11. In this example, the y-axes of the graphs schematically represent voltage and the x-axes of the graphs schematically represent time. The pressure sensor graph 1202 has a voltage change 1204 that may represent the rate of change of a press input measured on a piezoelectric pressure sensor. The voltage change 1204 is greater than the threshold line 1205. This may indicate that a press input has been initiated. The capacitance pressure sensing circuit graph 1202 has a first slope 1206, a pressure value 1208 and a second slope 1210. The capacitance pressure sensing graph also has a maintenance threshold line 1207. The first slop 1206 may represent an object beginning to apply a press input to a capacitance module. After the object begins to apply a stable pressure, the pressure value 1208 represents a specific voltage that is measured on a capacitance pressure sensing circuit based on the magnitude of the press input. When the object begins to release the press input on the capacitance module, the second slope 1210 represents the change in voltage on the capacitance pressure sensing circuit as the pressure is released. The maintenance threshold line 1207 is crossed by the first 1206 and second 1210 slopes. These crossings may indicate that a press input has been initiated at the first slope 1206 and terminated at the second slope 1210.

In some examples, a relative pressure sensor measures an initial pressure amount. The relative pressure sensor's measurements may normalize. Thus, the relative pressure sensor's measurements may not reflect consistency with the actual amount of pressure applied during the duration of the press input as the relative pressure sensor's measurements deteriorate over time thereby making the measurement from the relative pressure sensor unreliable during a maintenance pressure of the press input and/or a termination time of the press input.

A secondary pressure input may be used in addition to the relative pressure sensor. In some cases, the secondary pressure input may vary in its ability to consistently measure an accurate pressure reading based on changes in humidity, temperature, other conditions, or combinations thereof. One such other condition may be the user's finger size. For example, the secondary pressure sensor may be a capacitance sensor that uses the size of the contact area between the user's finger and the capacitance reference surface to determine changes in the amount of pressure that the user is applying to the capacitance reference surface. As finger sizes vary, the recorded pressure from the secondary pressure sensor may be inconsistent across users. However, in such an example, a relative peak measurement of the relative pressure sensor may be used to calibrate a secondary peak of the secondary pressure sensor. In such an example, as the pressure measurement from the relative pressure sensor diminishes, the controller can compare the rate of decline between the two pressure sensors. In the case where the measurement declines and the secondary pressure measurement maintains its same level, the controller may determine that the actual pressure value is maintained based on the measurements from the secondary sensor.

In some examples, when the measurements for a first pressure sensor and the second pressure sensor are different or depict divergent phenomena, a first set of characteristics may be determined based on the first pressure sensor's measurements and a second set of characteristics may be determined based on the second pressure sensor's measurements.

Figure 12B:
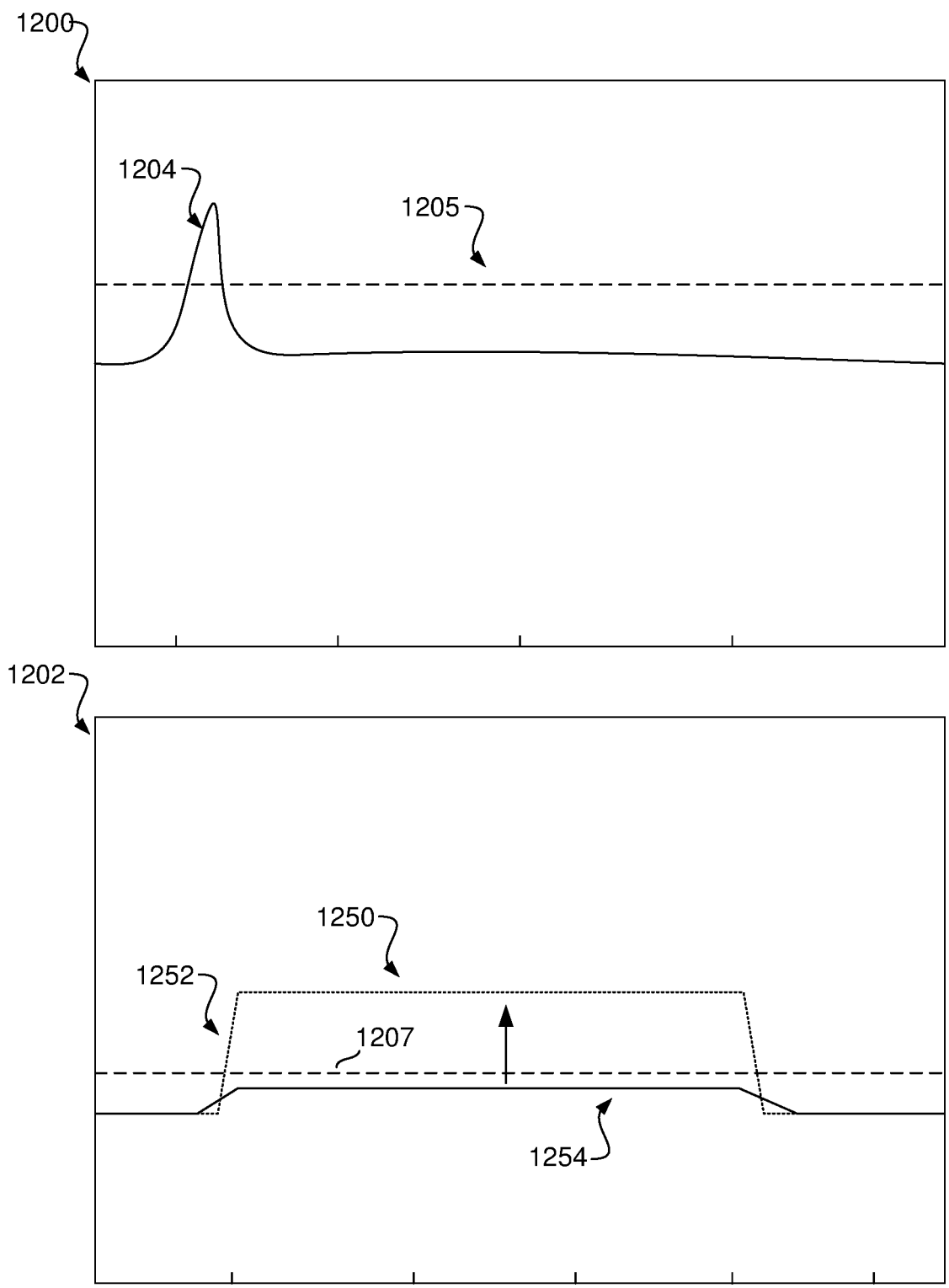
FIG. 12B depicts an example of press input measurements in accordance with the disclosure.

In some examples, a first pressure sensor is used to determine an initial pressure and its initial pressure is used to calibrate the initial pressure reading for the second pressure sensor. Such an example may be depicted in FIG. 12B. In this example, the pressure measurement 1254 from a second pressure sensor did not pass the predetermined pressure threshold 1207. However, based on the comparison between the measurements from both sensors, the pressure measurement of the second pressure measurement may be adjusted upwards to an adjusted measurement 1250 that brings the measurement from the second pressure sensor over the predetermined threshold 1207. In this case, the slopes 1252 of the original measurement 1254 and the adjusted measurement 1254 may be adjusted accordingly.

Figure 13:
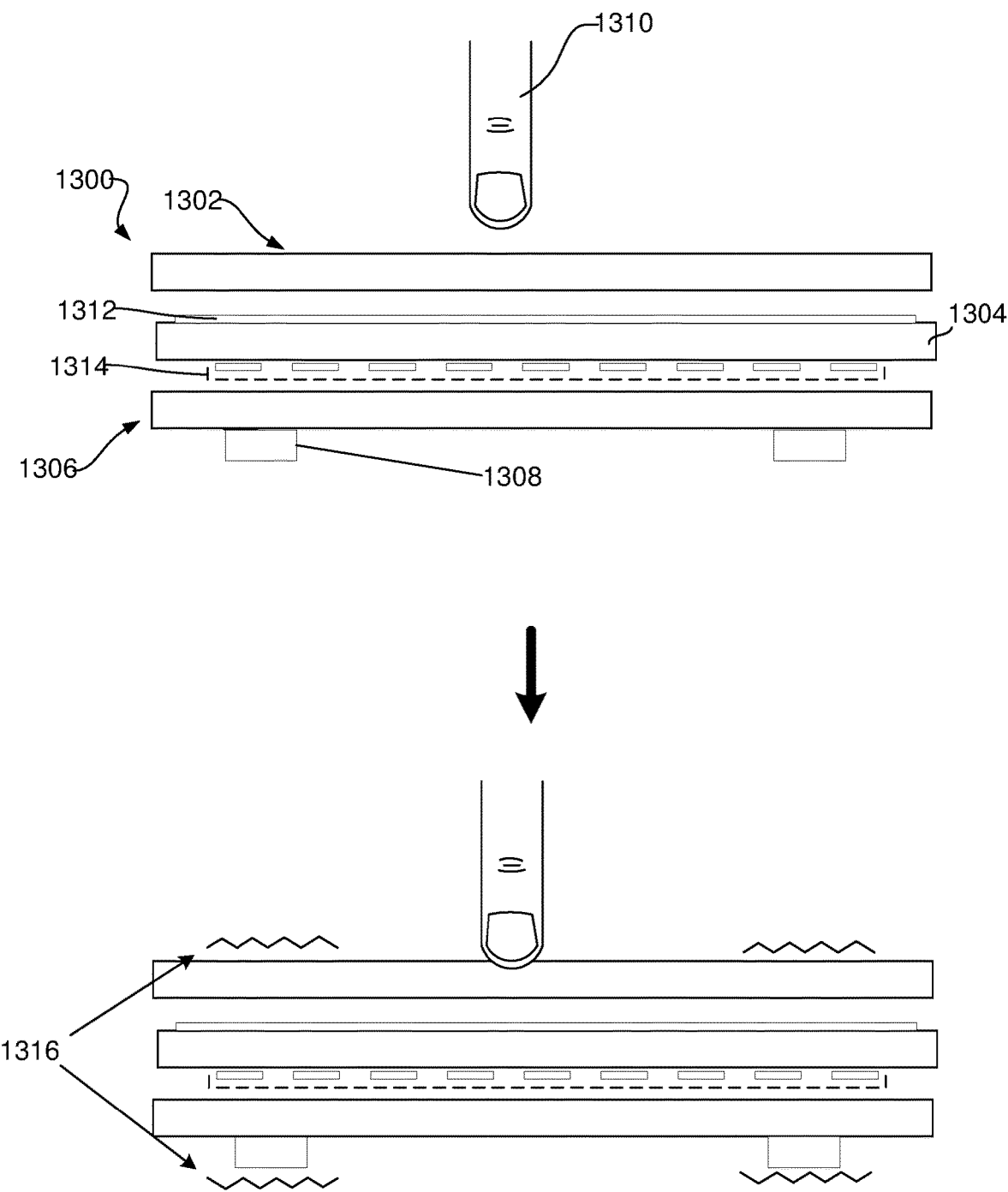
FIG. 13 depicts an example of a haptic response in accordance with the disclosure.

FIG. 13 depicts an example of a capacitance module 1300. A first substrate 1304 may be located between a reference surface 1302 and a second substrate 1306. The first substrate 1304 has a first side with a first set 1312 of electrodes and a second side with a second set 1314 of electrodes. The second substrate 1306 has a first side and a second side. A pressure sensor 1308 is positioned adjacent to the second side of the substrate 1306. In this example, a haptic effect 1316 may be caused in response to detecting a pressure applied by the object 1310 to the capacitance module. In some examples, the haptic response 1316 may be a single vibration of the pressure sensor. In other examples, one or more vibrations may be produced in a pattern. In some examples, the haptic response may vary in duration, pattern, intensity, another suitable aspect and/or a combination thereof. In some examples, a controller in communication with the sets 1312, 1314 of electrodes and/or the pressure sensor 1308 may produce a predetermined haptic response based, at least in part, on measurements determined by the press input of the finger 1310. In some examples, multiple pressure sensors may be used simultaneously to produce the haptic effect 1316.

Figure 14:
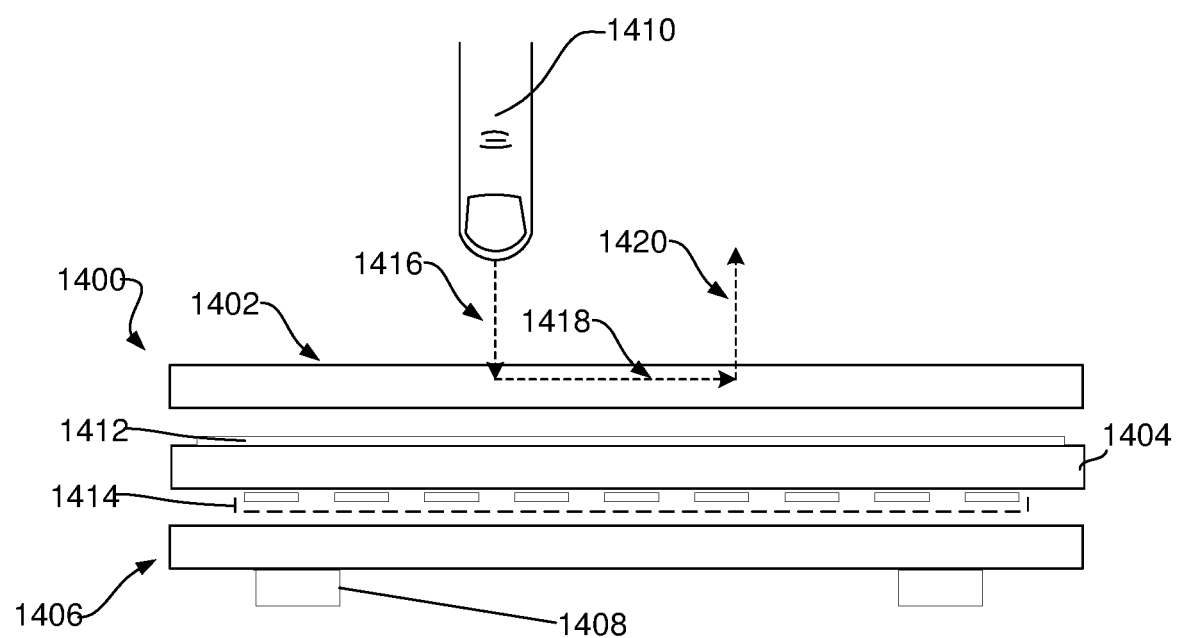
FIG. 14 depicts an example of a press input in accordance with the disclosure.

FIG. 14 depicts an example of a capacitance module 1400. A first substrate 1404 may be located between a reference surface 1402 and a second substrate 1406. The first substrate 1404 has a first side with a first set 1412 of electrodes and a second side with a second set 1414 of electrodes. The second substrate 1406 has a first side and a second side. A pressure sensor 1408 is positioned adjacent to the second side of the substrate 1406. An object 1410 moves along a path 1416, applies a press input on the capacitance reference surface 1402, moves along a path 1418 while continuing to apply the press input and then releases the press input as it moves along a path 1420. In this example, the object 1410 is a finger.

Figure 15:
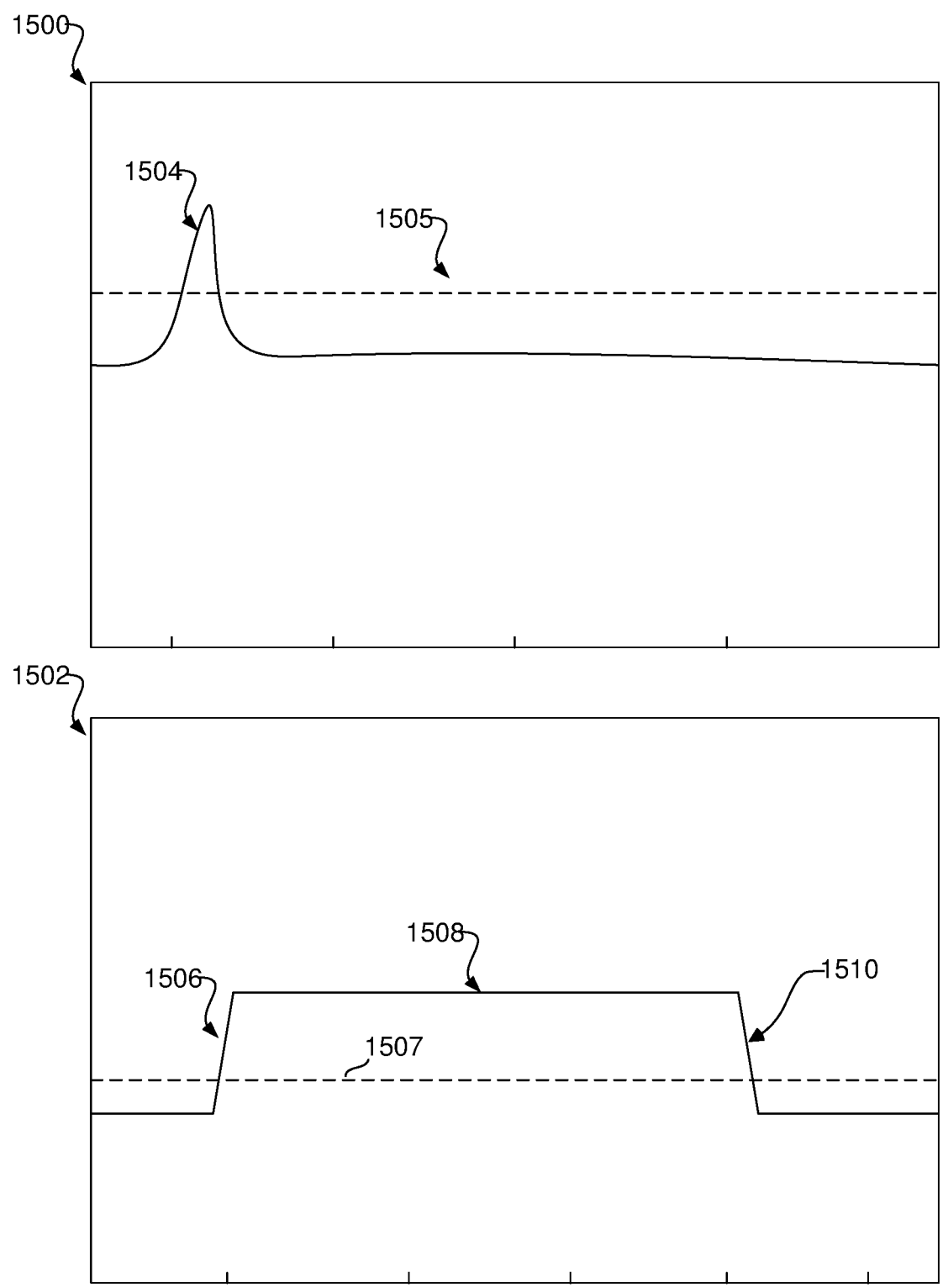
FIG. 15 depicts an example of press input measurements in accordance with the disclosure.

FIG. 15 depicts an example of a pressure sensor graph 1500 and a capacitance pressure sensing circuit graph 1502. In this example, the two graphs represent the measurements on the pressure sensor 1408 and the capacitance pressure sensing circuit of the example depicted in FIG. 14.

In this example, the first pressure sensor depicts a temporary change 1504 in pressure that crosses the predetermined threshold 1505 before dropping back below the predetermined threshold 1505. However, information from the temporary change 1504 can be used to gather some useful data, such as the occurrence of a press input, the pressure amount, the start time of the initial press input, another datum, or combinations thereof. This information may be used in conjunction with information from the second pressure measurement or used to calibrate a characteristic of the second pressure measurement.

For example, the second pressure input may determine a press input start time 1506 and/or a press input termination time 1510. In some examples, the peak of the second press input's pressure measurement may be represented by line segment 1506. If the original measurement from the second pressure input failed to cross the predetermined threshold, the pressure measurement may be scaled upwards to be above the predetermined threshold. As the second pressure measurement weakens due to the user either applying less pressure or completely terminating the pressure input, the second pressure measurement may drop back below the predetermined threshold to indicate a press input termination.

In this example, the user's finger is moving across the capacitance reference surface as part of the press input. While the location of the press input may change with respect to the capacitance reference surface, the user, if desired, may maintain or substantially maintain the pressure applied against the capacitance reference surface until the press input is completed.

Figure 16:
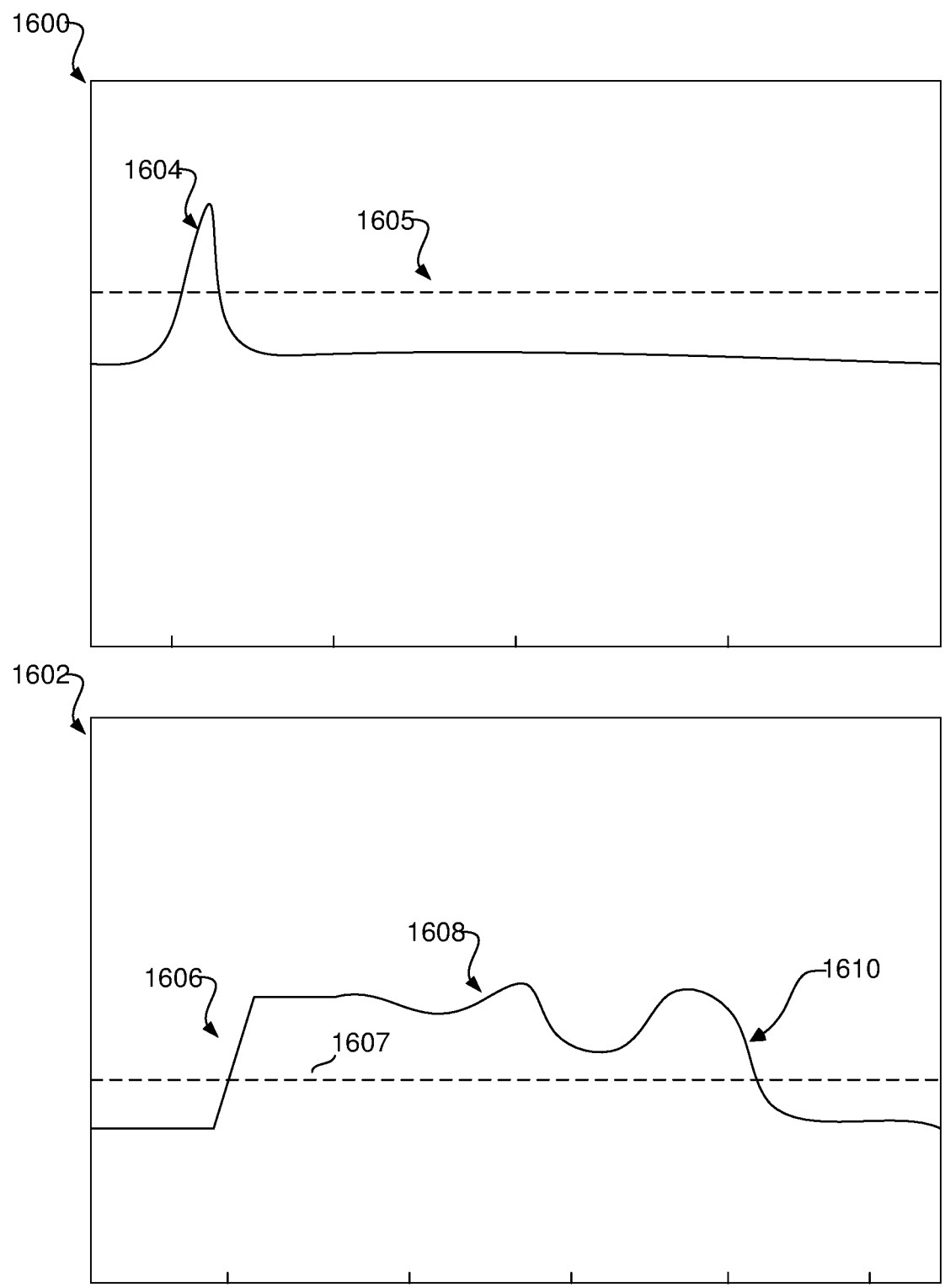
FIG. 16 depicts an example of press input measurements in accordance with the disclosure.

FIG. 16 depicts an example of a pressure sensor graph 1600 and a capacitance pressure sensing circuit graph 1602. In this example, the two graphs represent the measurements on the pressure sensor 1408 and the capacitance pressure sensing circuit of the example depicted in FIG. 14. When the press input is applied, a voltage change 1604 crosses a pressure voltage threshold 1605 in the pressure sensor graph 1600. A first slope 1606 crosses a capacitance pressure threshold 1607. As the press input moves across the capacitance module 1400, the magnitude of the press input varies according to the voltage curve 1608. As the press input is terminated, the second slope 1610 crosses the maintenance threshold 1607. This may indicate to a controller in communication with a capacitance pressure sensing circuit that is represented by the capacitance pressure sensing circuit graph 1602 that a press input has been terminated.

Figure 17:
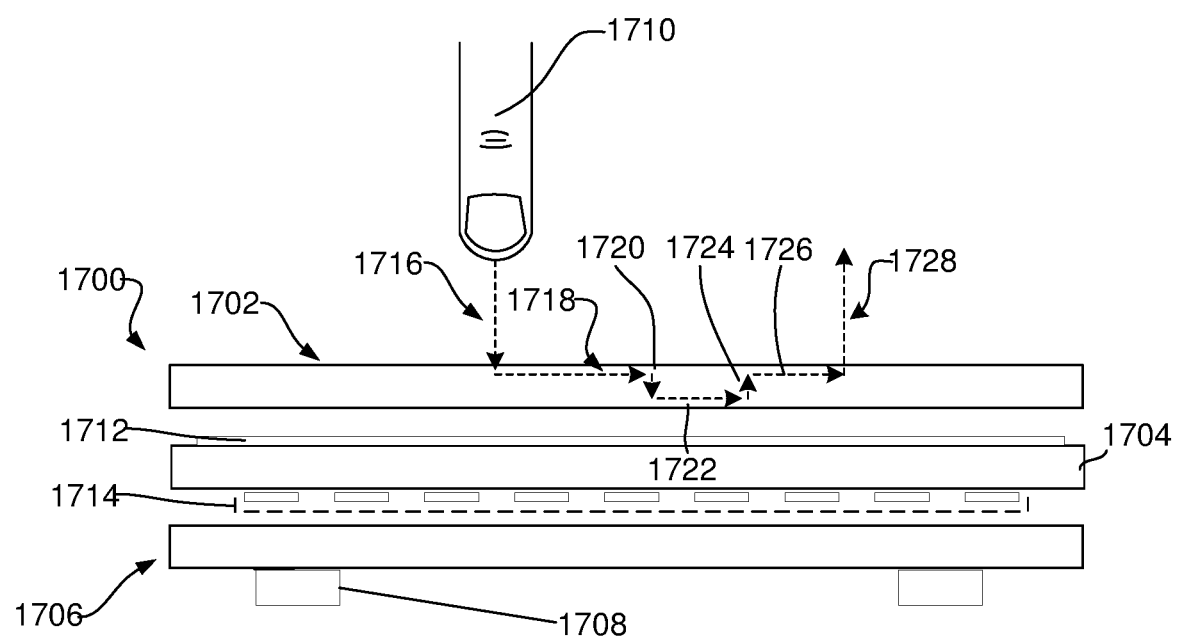
FIG. 17 depicts an example of a varied press input in accordance with the disclosure.

FIG. 17 depicts an example of a capacitance module 1700. A first substrate 1704 may be located between a reference surface 1702 and a second substrate 1706. The first substrate 1704 has a first side with a first set 1712 of electrodes and a second side with a second set 1714 of electrodes. The second substrate 1706 has a first side and a second side. A pressure sensor 1708 is positioned adjacent to the second side of the substrate 1706. An object 1710 moves along a path 1716, applies a first press input on the capacitance reference surface 1702, moves along a path 1718 while continuing to apply the first press input. The object 1710 moves along a path 1720 and applies a second press input onto the capacitance reference surface 1702 and moves along path 1722, continuing to apply the second press input. In some examples, the second press input may have a greater magnitude than the first press input. The object 1710 releases the second press input as it moves along a path 1724 and maintains the pressure of the first press input as it moves along a path 1726. The object releases the press input as it moves along path 1728. In this example, the object 1710 is a finger.

Figure 18:
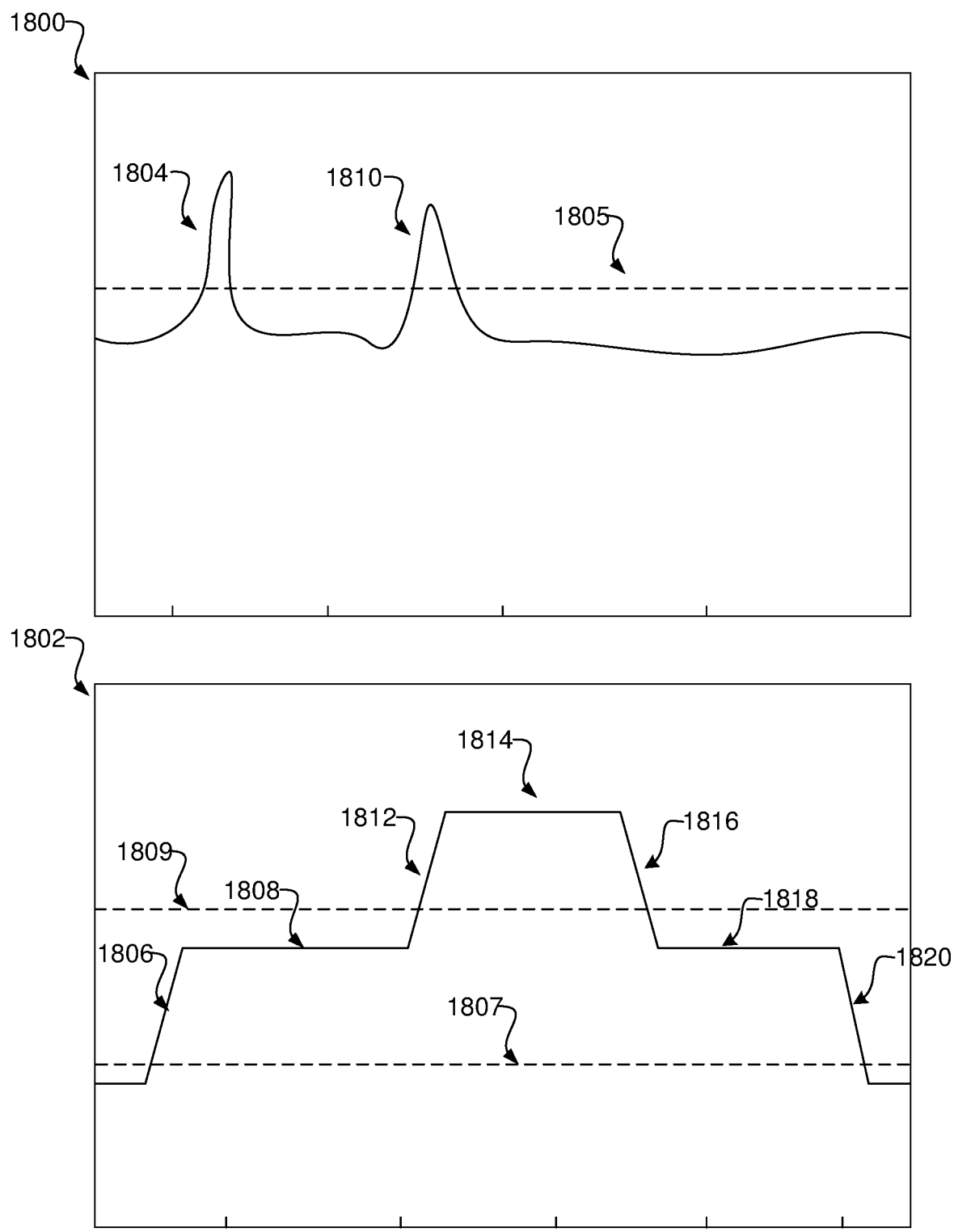
FIG. 18 depicts an example of press input measurements in accordance with the disclosure.

FIG. 18 depicts an example of a pressure sensor graph 1800 and a capacitance pressure sensing circuit graph 1802. In this example, the two graphs represent the measurements on the pressure sensor 1708 and the capacitance pressure sensing circuit of the example depicted in FIG. 17. A first voltage change 1804 on the pressure sensor graph represents a first press input on a capacitance reference surface. The voltage change 1804 crosses the pressure sensor threshold which may indicate that a first press input has been initiated. A second voltage change 1810 also crosses the pressure sensor threshold 1805 and may indicate that a second press input has been initiated. The first and second voltage changes may correspond to the first 1806 and second 1812 slopes of the capacitance pressure sensing circuit graph 1802. However, in this example, the first and second voltage changes 1803, 1810 appear to be temporary voltage spikes and drop relatively quickly below the predetermined threshold 1805 thereby being unreliable to determine the ongoing pressure of the press inputs or the termination of the press inputs. The first slope 1806 crosses a first capacitance pressure sensing circuit threshold 1807 and may indicate and/or confirm that a first press input has been initiated. The second slope 1812 crosses a second capacitance pressure sensing circuit threshold 1809 and may indicate and/or confirm that a second press input has been initiated.

Figure 19:
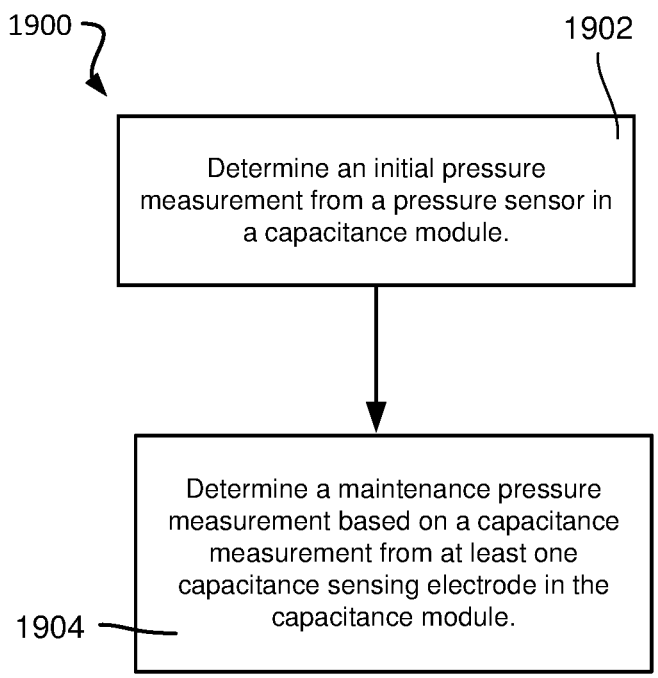
FIG. 19 depicts an example of a method of determining a press input in accordance with the disclosure.

FIG. 19 depicts an example of a method 1900 of measuring a press input. This method 1900 may be performed based on the description of the devices, modules, and principles described in relation to FIGS. 1-18. In this example, the method 1900 includes determining 1902 an initial pressure measurement from a pressure sensor in a capacitance module and determining 1904 a maintenance pressure measurement based on a capacitance measurement from at least one capacitance sensing electrode in the capacitance module.

Figure 20:
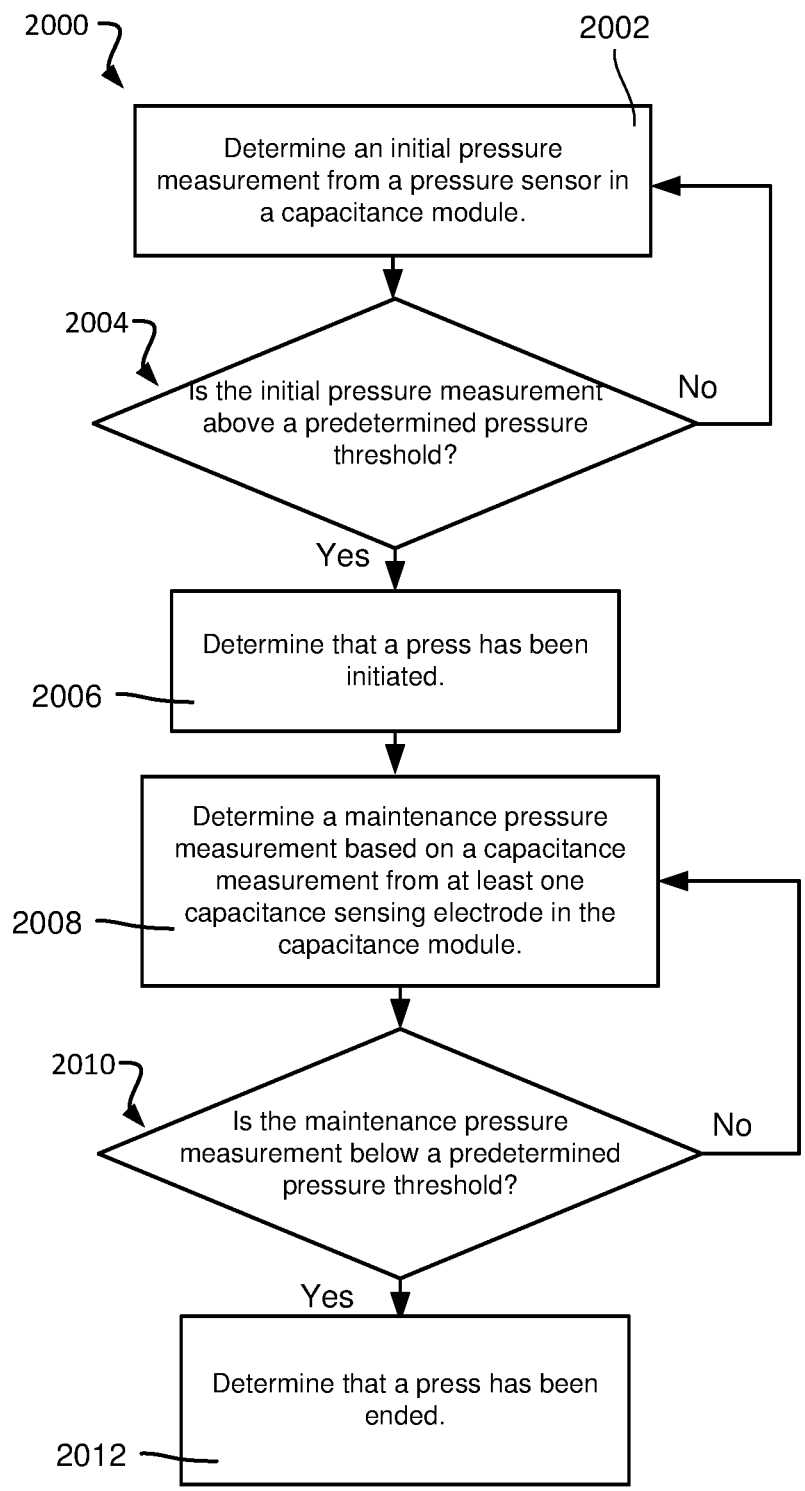
FIG. 20 depicts an example of a method of determining that a press input has been initiated and ended in accordance with the disclosure.

FIG. 20 depicts an example of a method 2000 of measuring a press input. This method 2000 may be performed based on the description of the devices, modules, and principles described in relation to FIGS. 1-18. In this example, the method 2000 includes determining 2002 an initial pressure measurement from a pressure sensor in a capacitance module and determining 2004 if the initial pressure measurement is above a predetermined pressure threshold. If the initial pressure measurement is above a predetermined pressure threshold, the method 2000 also includes determining 2006 that a press has been initiated. The method 2000 also includes determining 2008 a maintenance pressure measurement based on a capacitance measurement from at least one capacitance sensing electrode in the capacitance module and determining 2010 if the maintenance pressure measurement is below a predetermined pressure threshold. If the maintenance pressure measurement is below a predetermined pressure threshold, the method 2000 also includes determining 2012 that a press has been ended.

Figure 21:
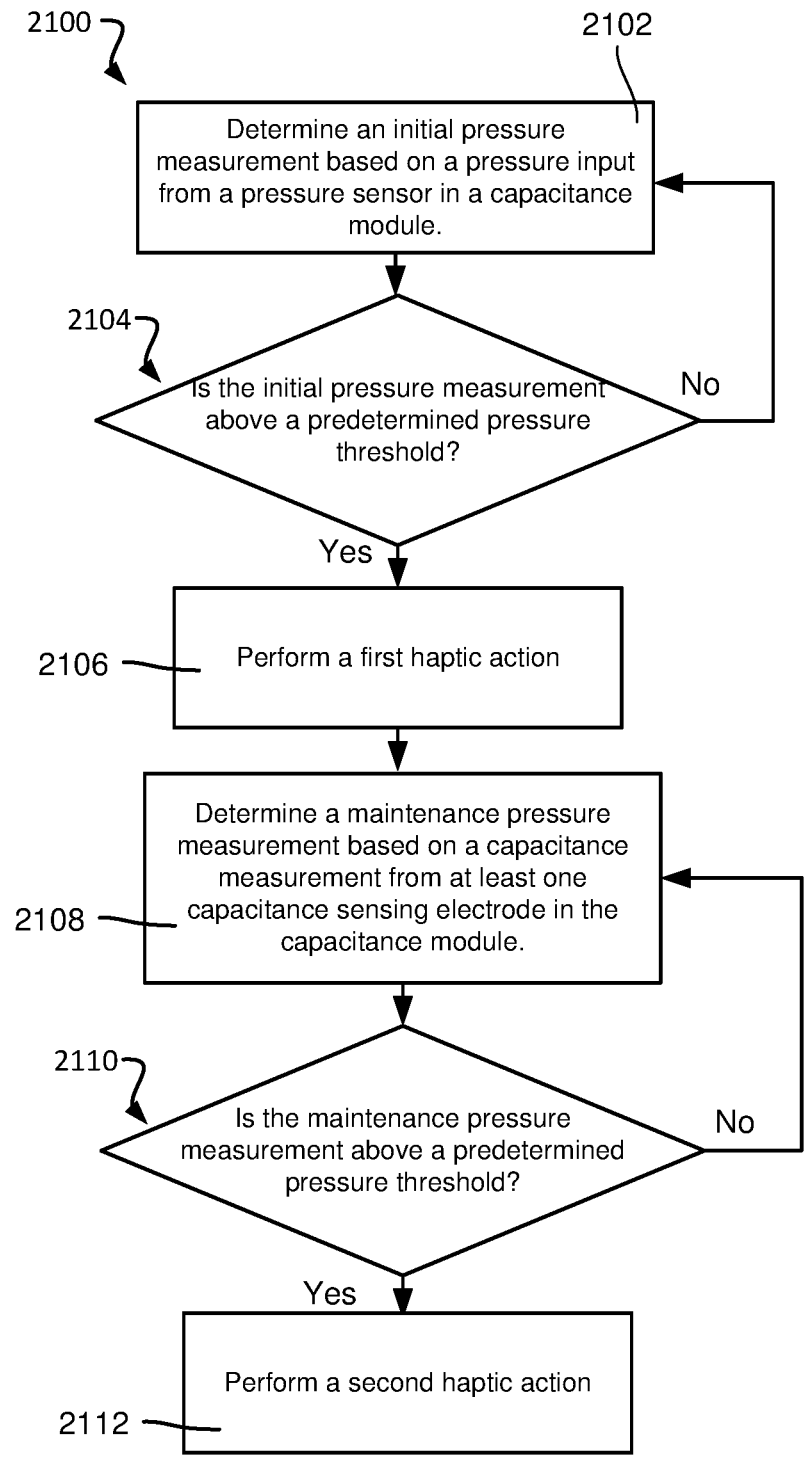
FIG. 21 depicts an example of a method of performing haptic responses in accordance with the disclosure.

FIG. 21 depicts an example of a method 2100 of measuring a press input. This method 2100 may be performed based on the description of the devices, modules, and principles described in relation to FIGS. 1-18. In this example, the method 2100 includes determining 2102 an initial pressure measurement from a pressure sensor in a capacitance module and determining 2104 if the initial pressure measurement is above a predetermined pressure threshold. If the initial pressure measurement is above a predetermined pressure threshold, the method 2100 also includes performing 2106 a first haptic action. The method 2100 also includes determining 2108 a maintenance pressure measurement based on a capacitance measurement from at least one capacitance sensing electrode in the capacitance module and determining 2110 if the maintenance pressure measurement is above a predetermined pressure threshold. If the maintenance pressure measurement is above a predetermined pressure threshold, the method 2100 also includes preforming 2112 a second haptic action.

Figure 22:
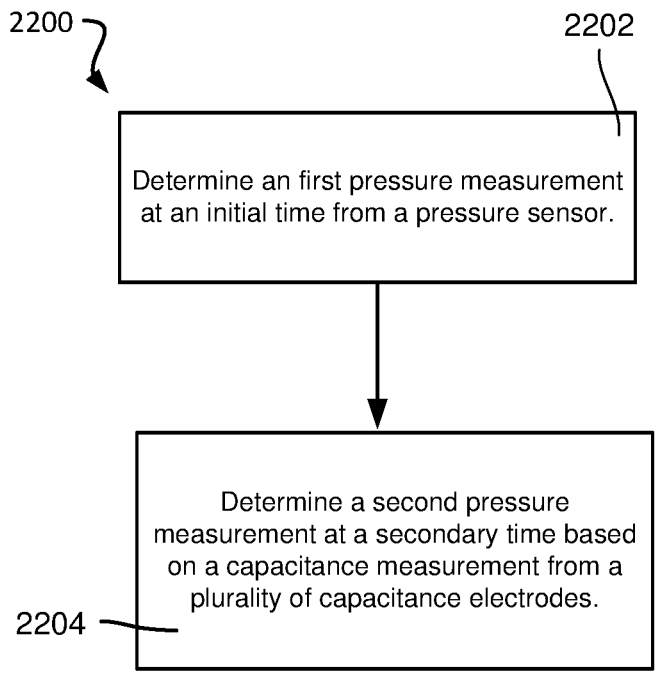
FIG. 22 depicts an example of a method of measuring a press input in accordance with the disclosure.

FIG. 22 depicts an example of a method 2200 of measuring a press input. This method 2200 may be performed based on the description of the devices, modules, and principles described in relation to FIGS. 1-18. In this example, the method 2200 includes determining 2202 a first pressure measurement at an initial time from a pressure sensor in a capacitance module and determining 2204 a second pressure measurement at a secondary time based on a capacitance measurement from a plurality of capacitance sensing electrodes.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skills in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
   substrate;
   a plurality of capacitance electrodes on the substrate;
   a non-capacitance pressure sensor incorporated into the capacitance module and in communication with a controller;
   the plurality of capacitance electrodes being in communication with the controller;
   memory in communication with the controller having programmed instructions that, when executed, cause the controller to:
      comparing a non-capacitance measurement from the non-capacitance pressure sensor with a capacitance measurement from the plurality of capacitance electrodes to trigger different types of haptic responses to a single press input;
      executing an initial haptic action in response to determining an initial pressure measurement of the single press input on the non-capacitance measurement; and executing a termination haptic action in response to determining the termination of the single press input based, at least in part, on the capacitance measurement.

2. The capacitance module of claim 1, wherein the programmed instructions are further configured, when executed, to cause the controller to determine a maintenance pressure force based, at least in part, on the capacitance measurement value staying above a predetermined capacitance measurement threshold.

3. The capacitance module of claim 2, wherein the programmed instructions are further configured, when executed, to cause the controller to determine an increase in the maintenance pressure force is based, at least in part, on a second pressure measurement from the non-capacitance pressure sensor.

4. The capacitance module of claim 3, wherein the programmed instructions are further configured, when executed, to cause the controller to execute a second down-click haptic action in response to determining the increase maintenance pressure measurement.

5. The capacitance module of claim 1, wherein determining the initial pressure measurement includes determining a press input start time.

6. The capacitance module of claim 1, wherein the initial haptic action is a down-click haptic response.

7. The capacitance module of claim 1, wherein the termination haptic action is an up-click haptic response.

8. The capacitance module of claim 1, wherein the non-capacitance pressure sensor is a piezoelectric sensor.

9. The capacitance module of claim 1, wherein the non-capacitance pressure sensor is an inductive pressure sensor.

10. The capacitance module of claim 1, wherein the non-capacitance pressure sensor is strain gauge.

11. The capacitance module of claim 1, wherein non-capacitance measurement is used to calibrate the capacitance measurement.

12. A computer-program product for using a capacitance module, the computer-program product comprising a non-transitory computer-readable medium storing instructions executable by a processor to:
compare a non-capacitance measurement with a capacitance measurement to trigger different types of haptic responses to a single press input;
execute an initial haptic action in response to determining an initial pressure measurement of the single press input based on the non-capacitance measurement; and
execute a termination haptic action in response to determining the termination of the single press input based, at least in part, on the capacitance measurement.

13. The computer-program product of claim 12, further including determining a maintenance pressure force is based, at least in part, on the capacitance measurement value staying above a predetermined capacitance measurement threshold.

14. The computer-program product of claim 13, wherein the programmed instructions are further configured, when executed, to cause the controller to determine an increase in the maintenance pressure force is based, at least in part, on a second pressure measurement from the non-capacitance pressure sensor.

15. The computer-program product of claim 14, wherein the programmed instructions are further configured, when executed, to cause the controller to execute a second haptic action in response to determining the increase maintenance pressure measurement.

16. A method for using a capacitance module, comprising:
comparing a non-capacitance measurement with a capacitance measurement to trigger different types of haptic responses to a single press input;
executing an initial haptic action in response to determining an initial pressure measurement of the single press input based on the non-capacitance measurement;
and executing a termination haptic action in response to determining the termination of the single press input based, at least in part, on the capacitance measurement.

* * * * *